United States Patent [19]

Bononi

[11] 4,222,640
[45] Sep. 16, 1980

[54] SAFETY SPECTACLES

[76] Inventor: Walter H. Bononi, Zeppelinstrasse 9, 7012 Fellbach-Schmiden, Fed. Rep. of Germany

[21] Appl. No.: 803,778

[22] Filed: Jun. 6, 1977

[51] Int. Cl.³ .......................... G02C 1/00; G02C 3/00; G02C 5/14; A61F 9/02
[52] U.S. Cl. ...................... 351/83; 351/41; 351/156; 351/122; 2/442
[58] Field of Search .................. 351/41, 51, 156, 122, 351/83; 2/426, 442, 443

[56] References Cited

U.S. PATENT DOCUMENTS

| D. 207,127 | 3/1967 | Simpson | 351/156 UX |
|---|---|---|---|
| 1,344,474 | 6/1920 | Beattey | 351/83 |

FOREIGN PATENT DOCUMENTS

| 1535556 | 7/1968 | France | 351/122 |
|---|---|---|---|
| 215693 | 5/1924 | United Kingdom | 351/83 |

Primary Examiner—John K. Corbin
Assistant Examiner—Rodney Bovernick

[57] ABSTRACT

Safety spectacles have an inner frame of hard elastic plastic material extending from one end piece, across the bridge to the other end piece. The base plates for the side piece hinges are embedded in the inner frame. A continuous wire is embedded in the inner frame. The inner frame is completely covered with a soft, elastic, polyurethane foam several millimeters thick which determines the shape of the spectacles.

10 Claims, 6 Drawing Figures

U.S. Patent   Sep. 16, 1980   4,222,640
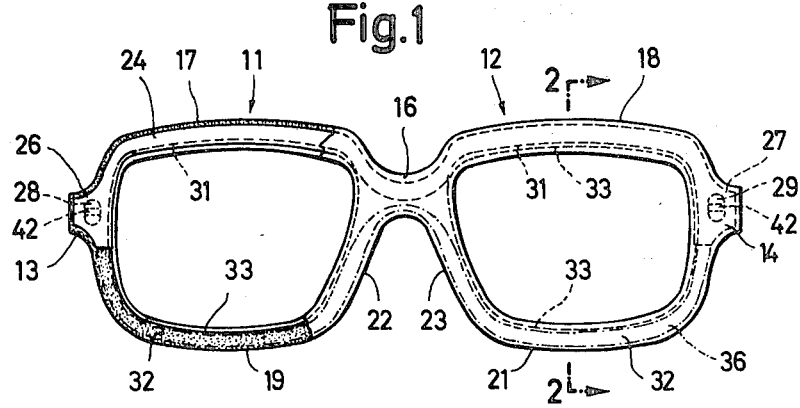
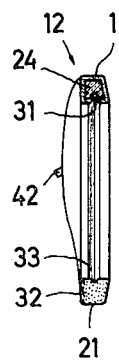 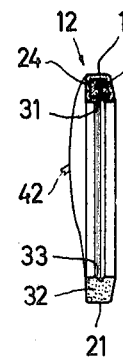 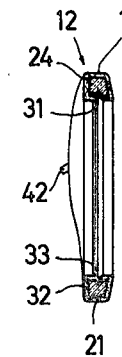 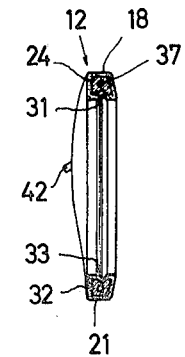
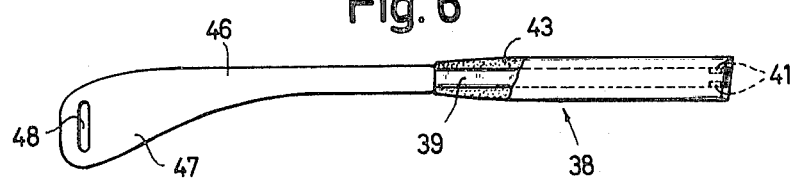

SAFETY SPECTACLES

BACKGROUND OF THE INVENTION

The invention concerns safety spectacles with two eye rims having lense grooves on their inside, these rims being connected by a one-piece bridge, with fixed hinge sections being provided on the outside and at the back of the end pieces, with nose pads being provided on the inside and at the back of the eye rims, and with two side pieces which are hinged with their hinge sections to the aforementioned hinge sections.

These spectacles are not to be compared with those used for protecting the eyes during grinding or welding. However, they are of the kind which can be provided with corrective lenses and which can be worn instead of the normal spectacles. These safety spectacles are e.g. required in the engine room of a sea-going vessel, during sailing, parachute-jumping, ballooning in caves and coal mines, when riding tanks etc.

If safety spectacles have already been suggested for similar uses, a glance into these and other associated areas shows that they have so far been without success. Perhaps these spectacles were either too soft so that the lenses came out of their mounting, or they were too crude because one had attempted to compensate for the missing rigidity by increasing the material mass, or one had forced the designers to design spectacles which owing to their design differed so much from the common type of spectacles that they were considered by their wearers as being unaesthetic. Perhaps the rims had been designed too thick. This is not only disadvantageous from an aesthetic point of view. There is an increased possibility of catching these spectacles on something. And the field of view beyond the rim is then uncovered. But even the non-focus area on the edges of the field of view contributes to a general orientation. But as mentioned at the beginning, no exact details are known.

OBJECTS AND STATEMENT OF THE INVENTION

It is the aim of the invention to provide safety spectacles which incorporate the following features:

(a) The spectacles must be of a design in line with the conventional spectacles.

(b) The spectacles must be able to absorb shocks without losing their shape to a great extent.

(c) The corrective lenses must be elastic and soft, but must be held securely.

(d) It must be possible to produce them cheaply.

(e) It must be possible to design the spectacles aesthetically appealing or even to create a fashion trend which would be advantageous to the use of the safety spectacles.

(f) The spectacles must be wearable all day, i.e. in warm, cold and damp conditions.

(g) In order to avoid disturbing reflections, it must be possible to manufacture the spectacles in a mat colour.

(h) When not in use, the spectacles must be storable in the normal way, i.e. in cases etc.

(i) The eye rims must not be too thick in order to be able to use as large corrective lenses as possible so that a large field of view is obtained.

(j) Under difficult conditions, the fit of the spectacles must be such that they have as little movement relative to the head as possible.

In accordance with the invention, these aims are achieved by the following characteristics:

(a) An inner frame of a hard, elastic material extends in one piece from one hinge section to the other through the upper parts of the eye rims and the bridge.

(b) The base plates of the hinge sections are embedded in the inner frame.

(c) The inner frame which does not emerge anywhere, is embedded in fine-celled polyurethane foam which encloses the inner frame several millimeters thick, determines the shape of the spectacles, is smooth, soft and elastic, forms the pads and is also provided with the lense grooves.

In a layer of a few millimeters, this polyurethane foam has sufficient elastic properties. It is close-celled and the spectacles do, therefore, not become heavier in humid conditions. It is easy to mold so that it does not require complicated manufacturing processes. It also follows delicate die shapes. It is harmless to skin, resistant to aging and resistant to perspiration so that wearing the spectacles does not result in any discolouration. It does not become brittle under cold conditions and does not get too soft in warmth. It insulates well so that e.g. under very cold conditions there is no freezing as a result of heat conducting bridges. It has a high coefficient of friction so that the spectacles are held firmly on the nose without pinching. The insertion of corrective lenses does not present any difficulties. Although the corrective lenses are held well, they do not crack as easily due to the comparatively soft mounting. This type of spectacle design is even interesting from the fashion point of view.

The characteristics of claim 2 result in the spectacles not producing any reflections at night. A mat-finish outer surface increases the frictional connection between nose and spectacles and results in more pleasant wearing characteristics. The molds need not be highly polished. Because of the mat surface which shows increased frictional properties, the spectacles slide off less frequently from vibrating tables etc.

The characteristics of claim 3 result in a splendid combination being achieved of the two basically contradicting properties, i.e. softness on one hand and rigidity on the other hand combined with a slim design.

The characteristics of claim 4 result in the spectacles still fitting if the inner frame has suffered a crack following a particularly high strain. However, this feature also enables a smaller cross-section of the inner frame to be selected so that one obtains slimmer spectacles with an unchanged polyurethane layer thickness, or one can provide a thicker polyurethane foam layer if the spectacles are not of an excessively crude appearance. This basically applies to designs where the inner frame consists solely of plastic. The characteristics of claim 5 also make the invention suitable for side pieces.

Through the characteristics of claim 6 it is achieved that a soft support is provided and the frictional connection is increased in the temple areas if the spectacles are subjected to lateral strain, but that the ear area can be adjusted by bending and made rigid over a large area in order to obtain a good ear fit.

The characteristics of claim 7 prevent the safety spectacles being lost if they fall off the wearer's nose, whereby in contrast to the commonly used cords a wide ribbon may be used which cuts in less and which cannot be slipped off over the ear part of the side pieces.

The invention is now described by way of preferred embodiments. The figures represent the following:

BRIEF DESCRIPTION OF THE DRAWINGS

FIG. 1 the partly opened front view of the eye rims together with the bridge of safety spectacles in accordance with the invention, at a scale of 1:1;

FIG. 2 a section along line 2—2 in FIG. 1;

FIG. 3 a section similar to FIG. 2, but through a second exemplified embodiment;

FIG. 4 a section similar to FIG. 2, but through a third exemplified embodiment;

FIG. 5 a section similar to FIG. 2, but through a fourth exemplified embodiment;

FIG. 6 the partly opened external view of a side piece in accordance with the invention, at a scale of 1:1.

DETAILED DESCRIPTION OF SPECIFIC EMBODIMENTS

The two eye rims 11 and 12 are provided with end pieces 13,14 on their outsides and are joined by a bridge 16. Each eye rim 11,12 has an upper rim 17,18, a lower rim 19,21 and a nose rim 22,23, sloping upwards.

FIG. 1 clearly shows the outer contours, and one can see from this representation at a scale of 1:1 that the spectacles are of a common, aesthetic, wearable design.

An inner frame 24 which is shown partly dotted and partly solid, extends from the end piece 13 through the upper rim 17, the upper area of bridge 16, the upper rim 18 and the end piece 14. In the area of end pieces 13,14, the inner frame 24 shows widenings 26,27 into which the base plates 28,29 of hinge sections are embedded which project at the back in the normal manner. The inner frame 24 consists of a hard plastic material as commonly used for spectacles. However, its surface has been left rough. A groove 31 is provided on the inner ede of the inner frame 24 as far as this extends along the upper frame 17,18.

The externally visible shape consists of polyurethane foam 32 which surrounds the inner frame 24 completely and exclusively forms the frame in the area of the lower rim 19,21 and the nose rim 22,23. The pads—not illustrated—provided on the back of the nose rim 22,23 also consist of this polyurethane foam 32. Along the inner edges the polyurethane foam is provided with lense grooves 33 so that corrective lenses may be inserted. In contrast to commonly known spectacles, the eye rims 11,12 need not be warmed.

FIG. 3 illustrates the possibility of embedding a metal wire 34 in the inner frame 24.

FIG. 4 shows that one can also have the inner frame 24 extend through the complete frame. This is illustrated by the dotted line 36. It should, however, be noted that in the bridge 16 the areas of the inner frame 24 lying one upon another or lying beneath one another are not or by all means not significantly connected with each other so that there is no massive hard plastic body provided inside.

FIG. 5 shows that a metal wire 37 may be passed through such a continuous inner frame 24. FIG. 6 shows that a metal core 39 is intended in the inside of the side pieces 38, this core being provided on the right-hand end of the temple as shown in the figure with a hinge section 41 of common design which fits on the hinge section 42 of end pieces 13,14. In the temple area, this metal core 39 is surrounded by polyurethane foam 43, and one can see from this 1:1 illustration that pleasant and commonly known designs do not have to be deviated from. The ear area of the metal core 39 is surrounded by hard and smooth plastic 46 which is widened at the end 47, this widening being larger than usual and showing an oblong hole 48.

The inner frame 24 must have a sufficiently elastic resiliency. Metal structures forming the inner frame or contained in it must, therefore, not consist of lead, aluminium, copper or similar materials which show little resiliency with the dimensions possible here.

What is claimed is:

1. In safety spectacles comprising two eye rims having end portions and on the inside of which lens grooves are provided, a one-piece bridge connecting the eye rims, fixed hinge sections on the outside and at the back of the end portions, nose pads on the inside and at the back of the eye rims, two side pieces having hinge sections hinged to the above-mentioned hinge sections, the improvement comprising:

an inner frame of a hard plastic material extending in one piece from one hinge section to the other, through the upper parts of the eye rims and the bridge, said inner frame having a surfac of natural roughness whereby a foam covering will securely adhere thereto, the base plates of the hinge sections being embedded in the inner frame, and a fine-celled polyurethane foam shape-defining exterior shell covering the inner frame several millimeters thick, determining the contour and shape of the spectacles independently of the inner frame, the inner frame not dictating the shape of the exterior shell and not emerging anywhere except at the lens grooves, the polyurethane foam being homergenous, soft and elastic and forming and defining deflectable nose pads without internal stiffening members.

2. Safety spectacles according to claim 1, in which the polyurethane foam has a mat exterior surface.

3. Safety spectacles according to claim 1, in which the inner frame also extends from the hinge sections through the lower parts of the eye rims and the bridge, the upper area of the inner frame being a separate piece from the lower area of the inner frame in the bridge.

4. Safety spectacles according to claim 1, in which the inner frame consists of hard, elastic, injection-molded plastic and comprising a continuous metal wire embedded in the inner frame.

5. Safety spectacles according to claim 1, in which the side pieces have a metal core surrounded by polyurethane foam.

6. Safety spectacles according to claim 5 in which the metal core is surrounded by polyurethane foam up to the temple area and is surrounded by hard plastic in the ear area.

7. Safety spectacles according to claim 6, in which the side pieces have a hole provided in the ear area.

8. Safety spectacles according to claim 1, in which the hard elastic material of the inner frame is a metal strip.

9. Safety spectacles according to claim 1, in which the inner frame consists solely of injection-molded plastic.

10. Safety spectacles according to claim 7 in which the hole is oblong.

* * * * *